United States Patent [19]

Allen

[11] Patent Number: 5,378,856

[45] Date of Patent: Jan. 3, 1995

[54] TRANSMISSION CABLE HAVING A NONHALOGENATED JACKET FORMULATION

[75] Inventor: Richard C. Allen, Liberty, Ind.

[73] Assignee: Belden Wire & Cable Company, Richmond, Ind.

[21] Appl. No.: 989,175

[22] Filed: Dec. 11, 1992

[51] Int. Cl.⁶ ............................................. H01B 7/34
[52] U.S. Cl. ........................ 174/120 R; 174/120 SR; 174/121 A; 252/609; 428/921
[58] Field of Search ......... 174/120 R, 120 SR, 121 R, 174/121 A; 252/609; 428/921

[56] References Cited

U.S. PATENT DOCUMENTS

| | | | |
|---|---|---|---|
| 4,322,575 | 3/1982 | Skipper | 174/120 SR |
| 4,370,076 | 1/1983 | Sullivan et al. | 174/120 R X |
| 4,430,470 | 2/1984 | Taniguchi et al. | 174/110 SR X |
| 4,500,748 | 2/1985 | Klein | 174/121 A |
| 4,671,896 | 6/1987 | Hasegawa et al. | 174/121 A X |
| 4,948,669 | 8/1990 | Rolland | 428/379 |
| 4,985,313 | 1/1991 | Penneck et al. | 428/627 |
| 5,001,304 | 3/1991 | Hardin et al. | 174/121 A X |
| 5,162,609 | 11/1992 | Adriaenssens et al. | 174/121 A X |
| 5,173,960 | 12/1992 | Dickerson | 174/121 A X |

FOREIGN PATENT DOCUMENTS

| | | | |
|---|---|---|---|
| 24349 | 2/1980 | Japan | 174/121 A |
| 97310 | 4/1989 | Japan | 174/121 A |

*Primary Examiner*—Morris H. Nimmo
*Attorney, Agent, or Firm*—Laff, Whitesel, Conte & Saret, Ltd.

[57] ABSTRACT

A transmission cable having a nonhalogenated jacket and a nonhalogenated composition for use as a transmission cable jacket. The jacket is prepared from a nonhalogenated polyolefin based formulation having flame retardant, low corrosivity, low toxicity and low smoke characteristics. The jacket material insulates a core transmission medium such as a metallic conductor or optical fiber. The jacket is extruded about the core or insulator during manufacture. The inventive cable has a jacket formed of nonhalogenated polyethylene and nonhalogenated ethylene vinyl acetate and provides a combination of desired mechanical characteristics, improved performance and manufacturing features while eliminating undesirable corrosive products released during a fire.

19 Claims, 1 Drawing Sheet

34 { BLEND OF NON-HALOGENATED POLYETHYLENE, ETHYLENE-VINYL ACETATE AND FLAME RETARDANT

TRANSMISSION CABLE HAVING A NONHALOGENATED JACKET FORMULATION

FIELD OF THE INVENTION

This invention relates to jacketing materials for transmission cables. More particularly, this invention relates to nonhalogenated jacketing materials for electrical and optical transmission cables.

BACKGROUND OF THE INVENTION

Typically, transmission cable jacket formulations comprise a thermoplastic material that is mixed, melted and extruded about a core carrier medium. Such jacket materials can insulate single or multiple filament conductors or can be used as an outer most jacket to bind and protect a core of isolated conductors. The core carrier medium is usually electrically or optically conductive.

Insulated or jacketed transmission cables are commonly used within commercial and residential buildings for distribution of power, for communication and for electronic control systems. Depending on the environment and the application, insulated or jacketed transmission cables must pass varying performance standards designed to enhance fire safety.

Generally, electrical or optical cabling installed in buildings and dwellings must pass tests to insure that standards are met for flame spread, smoke generation and other byproducts that are generated during a fire. Previous jacket compositions designed to address the problems of flame spread and smoke generation in building fires comprised primarily thermoplastic formulations relying heavily on halogenated materials such as fluoropolymers or polyvinyl chloride (PVC). Although many of these formulations have passed the appropriate flame tests required for their installation, certain undesirable characteristics still remain.

Jacket formulations incorporating halogenated materials inevitably produce corrosive products during a fire. Formulations making use of fluoropolymers or polyvinyl chloride produce unacceptable amounts of hydrofluoric and hydrochloric acid under these conditions. Such compounds are potentially dangerous, and may damage sensitive and expensive electronic equipment because of their corrosive nature.

Some jacket formulations, such as the Lindsay & Williams Megalon S300, have incorporated nonhalogenated materials in an effort to solve these problems. However, these compositions exhibit inferior mechanical qualities, are difficult to extrude and hence unduly expensive to manufacture.

What is needed, then, is a transmission cable jacket material that offers both the mechanical advantages and the fire resistance performance of halogenated formulations while eliminating the corrosive products these formulations release during a fire.

Accordingly, it is one of the objects of this invention to provide a transmission cable jacket material that produces noncorrosive flame byproducts.

It is another object of this invention to provide a transmission cable jacket material that produces nontoxic flame byproducts.

It is yet another object of this invention to provide a transmission cable jacket material that exhibits low flame spread characteristics.

It is still another object of this invention to provide a transmission cable jacket material that exhibits low smoke production during a fire.

It is a further object of this invention to provide a transmission cable jacket material that exhibits improved mechanical performance.

It a still further object of this invention to provide a transmission cable jacket material exhibiting improved manufacturing capability.

Additional objects will become apparent from the detailed description and claims that follow.

SUMMARY OF THE INVENTION

A transmission cable jacket formulation in accordance with the present invention is provided for the purpose of improving flame retardancy and reducing smoke and corrosive chemical production during a fire, while still maintaining desirable physical and manufacturing performance characteristics under normal operating conditions. The transmission cable jacket formulation comprises a mixture of a nonhalogenated polyethylene, a nonhalogenated ethylene vinyl acetate, a flame retardant, a process aide, a lubricant and an anti-oxidant.

In one embodiment, the invention comprises a mixture of high-density nonhalogenated polyethylene, a nonhalogenated ethylene vinyl acetate, a low-density nonhalogenated polyethylene, alumina trihydrate as a flame retardant, silicone fluid as a process aide and flame retardant enhancer, magnesium stearate as a lubricant and flame retardant enhancer and two anti-oxidants. The inventive material is mixed, melted and extruded about a single or multiple conductor core. The core transmission medium includes an electrical or optical conductor, or a bundle of electrical or optical conductors.

BRIEF DESCRIPTION OF THE DRAWINGS

These and other features of this invention are best understood by referring to the following detailed description of the invention, taken in conjunction with the accompanying drawings, in which.

DETAILED DESCRIPTION OF THE INVENTION

Figure 1:
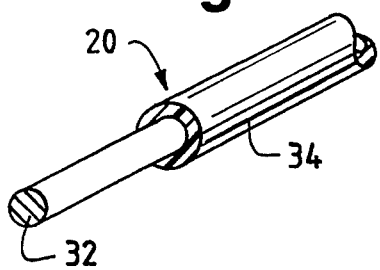
FIG. 1 is a partial perspective view of a cable incorporating the inventive jacket material.

The inventive jacket material comprises a mixture of nonhalogenated polyolefins selected from the group consisting of:
i. a nonhalogenated polyethylene;
ii. a nonhalogenated ethylene vinyl acetate;
iii. a flame retardant;
iv. a process aide and flame retardant enhancer;
v. a lubricant and flame retardant enhancer; and
vi. an anti-oxidant.

In another embodiment, the jacket material composition preferably comprises:
i. a high density nonhalogenated polyethylene;

ii. a nonhalogenated ethylene vinyl acetate;
iii. a low density nonhalogenated polyethylene;
iv. a flame retardant;
v. a process aide and flame retardant enhancer;
vi. a lubricant and flame retardant enhancer; and
vii. two anti-oxidants.

In the description of the formulations below, the amounts of the additives are described in parts per hundred of resin (phr). The resin here is the high density nonhalogenated polyethylene.

One embodiment of the jacket formulation comprises a blend of high density nonhalogenated polyethylene such as DGDK-3364 NT, and a low density nonhalogenated polyethylene such as DFD-6005 as major components, both being available from the Union Carbide company. A nonhalogenated ethylene vinyl acetate such as Elvax 360, which is available from the DuPont company, is used as a polyethylene modifier to reduce brittleness, improve elongation and increase tensile strength.

A flame retardant additive used in the nonhalogenated polyolefin formulation may be any material that retards the flammability of the jacket material and does not harm the properties of the jacket material. Flame retardant materials suitable for use in conjunction with the nonhalogenated polyolefin include alumina trihydrate, which is available from the NYCO company under the name 10734 ATH or equivalent. The flame retardant composition may be present in any amount sufficient to retard flames in the jacket composition. Preferably, the flame retardant may be present in amounts between 150 and 524 phr, more preferably 371 phr.

A process aide additive used in the nonhalogenated polyolefin formulation may be any material that improves the processing of the components and reduces the flammability that does not harm the properties of the jacket material. Process aide materials suitable for use in conjunction with nonhalogenated polyolefins include high viscosity silicone fluid, which is available from the General Electric company under the name SRF-100. The process aide composition may be present in any amount sufficient to facilitate processing of the components. Preferably, the process aide may be present in amounts between 1.0 and 30 phr, more preferably 3.75 phr.

A lubricant additive used in the nonhalogenated polyolefin formulation may be any material that aides in the lubricity of the jacket material and does not harm their properties. Lubricant materials suitable for use in conjunction with nonhalogenated polyolefins include magnesium stearate, which is available from the Witco company. The lubricant composition may be present in any amount sufficient to facilitate lubricity of the jacket material. Preferably, the lubricant may be present in amounts between 2.0 and 60 phr, more preferably 8.8 phr.

An anti-oxidant additive used in the nonhalogenated polyolefin formulation may be any material that enhances the thermal heat aging of the jacket material that does not harm the properties of the jacket material. Anti-oxidant materials suitable for use in conjunction with nonhalogenated polyolefins include hindered phenolics which are available from the Ciba-Geigy company under the name Irganox 1010 and zinc-2-mercaptotoluiamidezoles which are available from the R. T. Vanderbilt company under the name ZMTI. The anti-oxidant composition may be present in any amount sufficient to enhance the thermal heat aging of the jacket material. Preferably, the anti-oxidant may be present in amounts between 3.0 and 10.0 phr, more preferably 3.0 phr.

A preferred formulation useful as a jacket material comprises:

TABLE I

| INGREDIENTS | PHR |
|---|---|
| 1. a high density nonhalogenated polyethylene - 100 parts | |
| 2. a nonhalogenated ethylene vinyl acetate | 20–100 |
| 3. a low density nonhalogenated polyethylene | 0–60 |
| 4. a flame retardant | 150–524 |
| 5. a process aide flame retardant enhancer | 1.0–30 |
| 6. a lubricant and flame retardant enhancer | 2.0–60 |
| 7. an anti-oxidant | 3.0–10.0 |

Referring now to FIGS. 1–4, there are shown various applications of the inventive jacket formulation. FIG. 1 shows a transmission cable 20 that comprises a single conductor 32 that is generally insulated 34 thereon.

Figure 2:
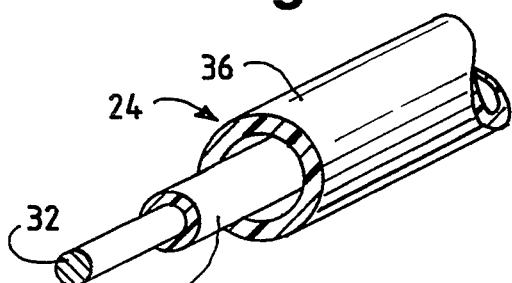
FIG. 2 is a partial perspective view of an alternative embodiment of a cable incorporating the inventive jacket material.

Another application, transmission cable 24 of FIG. 2, shows a single conductor 32 generally surrounded by an insulator 34. The insulator 34 is then further surrounded by a cable jacket 36.

Figure 3:
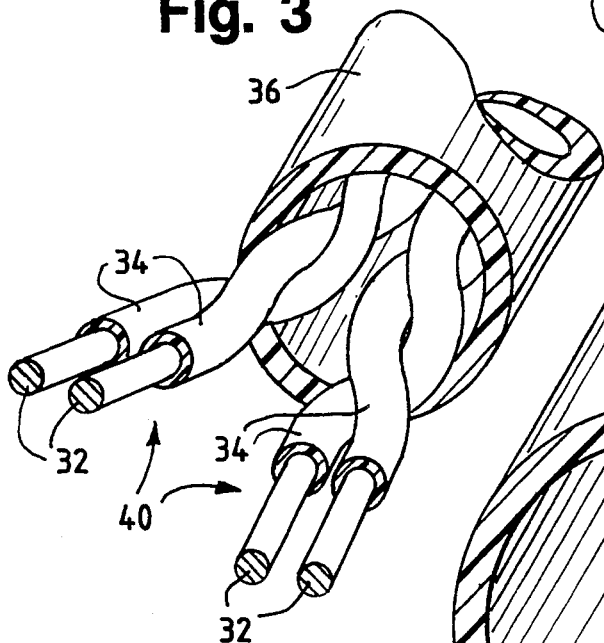
FIG. 3 is a partial perspective view of an another embodiment of a cable incorporating the inventive jacket material.

The core carrier medium may comprise more than just single conductors or bundles of individual conductors. Transmission cable 28, as shown in FIG. 3, comprises single conductors 32 generally insulated 34 thereon, that are twisted into conductive pairs to form a core carrier medium 40. The core medium 40 may then be encased by a cable jacket 36. Twisted pairs such as these are commonly used to reduce static interference that occurs in certain cable designs.

Figure 4:
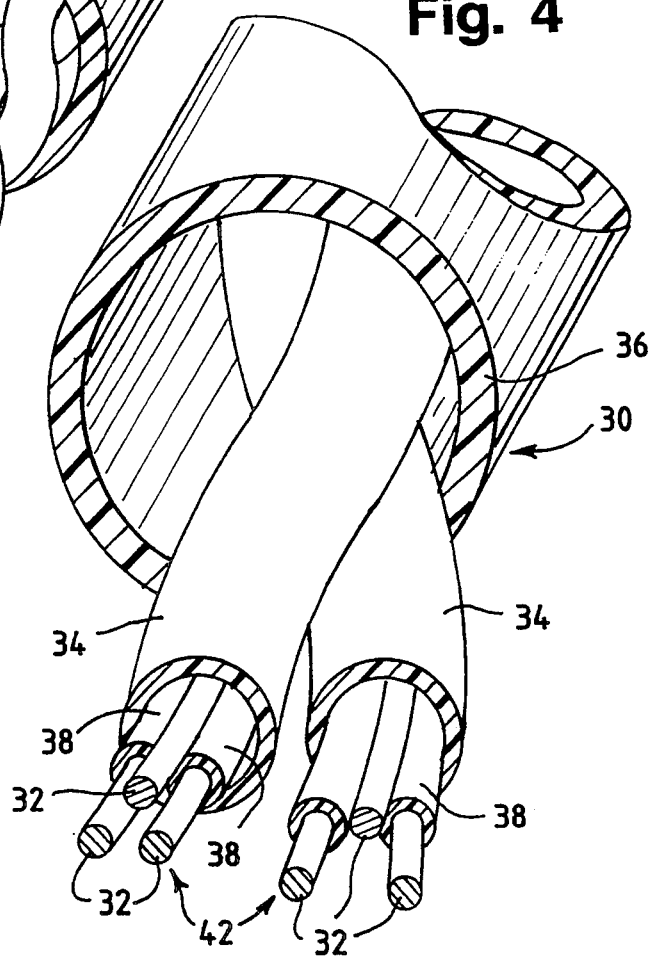
FIG. 4 is a partial perspective view of an additional embodiment of a cable incorporating the inventive jacket material.

Similarly, twisted pair transmission core members need not consist of single conductor elements. Transmission cable 30, as shown in FIG. 4, comprises bundles of individual conductors 38 generally insulated thereon 34. The insulated bundles are then twisted to form a core 42 that is further encased by a cable jacket 36.

Thus, the inventive cable jacket formulation may be used in many different cable constructions. The construction may be as simple as a single insulated unjacketed conductor. More complex forms are also possible, such as two or more insulated conductors or twisted pairs comprising a core carrier medium encased by an outer protective cable jacket. The carrier medium may consist of either electrical or optical conductors.

The following example is included for illustrative purposes only. All parts and percentages are by weight. The materials were combined together in a mill-type mixing operation, heated, melted and extruded about an electrically transmissive core.

EXAMPLE:

The following formulation was used to insulate electrical transmission cable:

TABLE II

| INGREDIENTS | Parts |
|---|---|
| 1. a high density nonhalogenated polyethylene, DGDK-3364 NT | 100.0 |
| 2. an ethylene vinyl acetate, Elvax 360 | 80.0 |
| 3. a low density polyethylene, DFD-6005 | 25.0 |
| 4. an alumina trihydrate flame retardant, 10734 ATH | 371.0 |

TABLE II-continued

| INGREDIENTS | Parts |
| --- | --- |
| 5. a high viscosity silicone fluid process aide and flame retardant enhancer, silicone SRF-100 | 3.75 |
| 6. a lubricant and flame retardant enhancer, magnesium stearate | 8.8 |
| 7. an anti-oxidant, hindered phenolic, Irganox 1010 | 3.0 |
| 8. an anti-oxidant, zinc-2-mercaptotoluiamidezole, ZMTI | 3.0 | n1, n3. Available from the Union Carbide company.
n2. Available from the DuPont company.
n4. Available from the Nyco company.
n5. Available from the General Electric company.
n6. Available from the Witco company.
n7. Available from the Ciba-Geigy company.
n8. Available from the R. T. Vanderbilt company.

Properties of the example formulation were determined by using the following test methods. The test results for the example formulation of this invention are shown in Table III below.

TABLE III

| Property | Test Method | Results |
| --- | --- | --- |
| Tensile Strength | ASTM D638 | 1600 |
| % Elongation | ASTM D638 | 350 |
| L.O.I | ASTM D2863 | 33 |
| Halogen Content | Mil-C-24643 | <.5% |
| Acid Gas Evolution | Mil-C-24643 | <2% |
| Cold Bend | ASTM 4565 | −20° C. |
| Flammability | U.L. | V-O |
| NBS Smoke Flaming | ASTM E662 | 45 |
| NBS Smoke Smoldering | ASTM E662 | 295 |
| Temperature Rating | U.L. | 60° C. |
| Dielectric Constant | U.L. | 5.5 |

The test results show that the inventive jacket formulation has excellent mechanical performance characteristics. The formulation has high tensile strength, yet exhibits remarkably good elongation. The formulation is not brittle under normal operating conditions, but remains flexible as shown by the cold bend test results.

The test results also show that the inventive formulation exhibits low smoke production and good flame retardancy. In addition, because the formulation has a low halogen content, acid gas evolution is almost nonexistent.

Thus, the desirable characteristics of this formulation include enhanced flame retardancy and low smoke generation when burned. Mechanical performance is improved through reduced brittleness, increased elongation and tensile strength. Manufacturing performance is also enhanced by relaxed temperature and tooling requirements during extrusion, resulting in faster production speeds and lower overall costs. Because of the nonhalogenated formulation, acid gas evolution and toxicity are reduced to levels far below those of halogenated formulations that release significant amounts of corrosive gases such as hydrogen fluoride or hydrogen chloride when burned.

While particular embodiments of the invention have been shown and described, it will be obvious to those skilled in the art that various changes and modifications may be made therein without departing from the spirit and scope of the invention and therefore, it is intended in the appended claims to cover all such changes and modifications which fall within the true spirit and scope of the invention.

What is claimed is:

1. A transmission cable having a nonhalogenated jacket wherein said jacket comprises a mixture of a flame retardant, 100 parts of a high density nonhalogenated polyethylene, from about 0 to about 60 parts of low density nonhalogenated polyethylene and from about 20 to about 100 parts ethylene vinyl acetate.

2. The transmission cable of claim 1 wherein said jacket mixture further comprises from about 150 to about 524 parts nonhalogenated flame retardant, from about 1 to about 30 parts of a nonhalogenated process aid, from about 2 to about 60 parts of a nonhaloganated lubricant, and from about 3.0 parts to about 10.0 parts of a nonhalogenated anti-oxidant.

3. The transmission cable of claim 2 wherein said flame retardant is an aluminum hydrate, said process aide and flame retardant is a high viscosity silicone fluid and said lubricant is a magnesium stearate.

4. The transmission cable of claim 3 wherein said jacket mixture further comprises about 80 parts ethylene vinyl acetate, about 25 parts low density nonhalogenated polyethylene, about 371 parts alumina trihydrate, about 3.75 parts high viscosity silicone, about 8.8 parts magnesium stearate and about 6.0 parts anti-oxidant.

5. The transmission cable of claim 4 wherein the anti-oxidant is 3.0 parts of hindered phenolics and 3.0 parts of zinc-2-mercaptotoluiamidezole.

6. The transmission cable of claim 2 wherein said nonhalogenated anti-oxidant is at least one of hindered phenolics and zinc-2-mercaptotoluiamidezole.

7. The transmission cable of claim 6 wherein the nonhalogenated anti-oxidant is a mixture of hindered phenolics and zinc-2-mercaptotoluiamidezole.

8. The transmission cable of claim 1 wherein said mixture includes a nonhalogenated anti-oxidant which is at least one of hindered phenolic and zinc-2-mercaptotoluiamidezole.

9. The transmission cable of claim 8 wherein said mixture includes a nonhalogenated process aid and a nonhalogenated lubricant.

10. A transmission cable formulation comprising a core carrier medium having at least one conductor, an insulator surrounding said medium, a jacket surrounding said insulator and said medium and at least one of said insulator and said jacket comprising a high-density nonhalogenated polyethylene, a nonhalogenated ethylene vinyl acetate, a low density nonhalogenated polyethylene, a flame retardant comprising alumina trihydrate, a process aide comprising silicone fluid, a lubricant comprising magnesium stearate and an anti-oxidant.

11. The jacket formulation of claim 10 further comprising an electrically conductive carrier medium encased by said formulation.

12. The jacket formulation of claim 10 further comprising an optically conductive carrier medium encased by said formulation.

13. The jacket formulation of claim 10 wherein said anti-oxidant comprises at least one of hindered phenolic and zinc-2-mercaptotoluiamidezole.

14. A nonhalogenated jacket composition for a transmission cable jacket comprising 100 parts of a high density nonhalogenated polyethylene, from about 0 to about 60 parts of low density nonhalogenated polyethylene and from about 20 to about 100 parts ethylene vinyl acetate.

15. The composition of claim 14 wherein said jacket mixture further comprises from about 150 to about 524 parts nonhalogenated flame retardant, from about 1 to about 30 parts of a nonhalogenated process aid, from about 2 to about 60 parts of a nonhalogenated lubricant, and from about 3.0 parts to about 10.0 parts of a nonhalogenated anti-oxidant.

16. The composition of claim 15 wherein said flame retardant is an aluminum hydrate, said process aide and flame retardant is a high viscosity silicone fluid and said lubricant is a magnesium stearate.

17. The composition of claim 16 wherein said jacket mixture further comprises about 80 parts ethylene vinyl acetate, about 25 parts low density nonhalogenated polyethylene, about 371 alumina trihydrate, about 3.75 parts high viscosity silicone, about 8.8 parts magnesium stearate and about 6.0 parts anti-oxidant.

18. The composition of claim 14 wherein said nonhalogenated anti-oxidant is at least one of hindered phenolics and zinc-2-mercaptotoluiamidezole.

19. The composition of claim 18 wherein the nonhalogenated anti-oxidant is a mixture of hindered phenolics and zinc-2-mercaptotoluiamidezole.

* * * * *